United States Patent [19]
Donald et al.

[11] Patent Number: 5,216,640
[45] Date of Patent: Jun. 1, 1993

[54] INVERSE BEAMFORMING SONAR SYSTEM AND METHOD

[75] Inventors: James Donald, Pawcatuck; Albert H. Nuttall, Old Lyme, both of Conn.; James H. Wilson, San Clemente, Calif.

[73] Assignee: The United States of America as represented by the Secretary of the Navy, Washington, D.C.

[21] Appl. No.: 952,400

[22] Filed: Sep. 28, 1992

[51] Int. Cl.[5] .............................................. G01S 3/80
[52] U.S. Cl. .................................... 367/124; 367/118; 367/119; 367/901
[58] Field of Search ................ 367/124, 901, 118, 119

[56] References Cited

U.S. PATENT DOCUMENTS 4,965,732  10/1990  Roy, III et al. ....................... 367/124

*Primary Examiner*—Daniel T. Pihulic
*Attorney, Agent, or Firm*—Michael J. McGowan; Prithvi C. Lall; Michael F. Oglo

[57] ABSTRACT

An apparatus and method for detecting, processing, and tracking sonar signals is provided. Plane wave energy from the sonar signal source is measured at multiple points using an array of plane wave energy receptors. These measurements are processed using an inverse beamformer to generate output beam levels. These output beam levels are then processed using the spectrum normalizer to yield spatially and spectrally normalized output beam levels. The normalized beam levels are then processed using an eight nearest-neighbor peak-picker to provide plane wave peaks. Finally, the plane wave peaks are processed by a three-dimensioned M of N tracker to identify peaks within a specified limit of frequency and angle change over time. The identified peaks may be displaced or recorded for further analysis.

7 Claims, 4 Drawing Sheets

|  | AZIMUTH 1 | AZIMUTH 2 | AZIMUTH 3 |
|---|---|---|---|
| FREQUENCY BIN 1 | 4 | 2 | −1 |
| FREQUENCY BIN 2 | 3 | ⑧ PEAK | 2 |
| FREQUENCY BIN 3 | 0 | 6 | 5 |

FIG. 2

FIM BEARING TIME PLOT

* 21.5 Hz BIN
* $\Delta\theta = 20°$
* $\Delta f = 3$ Hz
* M of N = 4 OF 5

FIM LOFARGRAM

* 0° TO 60° SECTOR
* $\Delta\theta = 20°$
* $\Delta f = 3$ Hz
* M of N = 4 OF 5

INVERSE BEAMFORMING SONAR SYSTEM AND METHOD

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to the field of sonar and more specifically to sonar systems using inverse beamforming techniques.

(2) Description of the Prior Art current sonar systems include many different configurations using a variety of technologies. However, because a sonar signal from a specific source may have a complex wave front which is received at different points along a hydrophone array at different times, a beamforming process must be implemented to correlate the signals received at each point in the hydrophone array. This decomposition of the acoustic field provides the basis for sonar signal detection and tracking.

Several implementations of beamforming processes exist in the prior art. Most of these implementations have been accomplished by time delaying the time series signals from each hydrophone in order to beamform the array of hydrophones. This process is referred to as a conventional time delay beamforming sonar system. However, space and weight constraints on the hardware required for implementation of a conventional time delay beamforming system limits, in practice, the number of individual beams which can be formed. Because of this limited number of beams, conventional beamforming systems must use beams which are spaced relatively far apart in azimuth. Unfortunately, such spacing may cause low intensity signals located between beams to be lost. Additionally, on these conventional sonars fixed threshold levels must be established to avoid erroneous signal declarations.

SUMMARY OF THE INVENTION

Accordingly, an object of the present invention is to provide a system and method for detecting, processing, and tracking sonar signals using a hydrophone array having elements disposed at any desired spacing.

A further object of the invention is to provide a system and method for detecting, processing, and tracking sonar signals having strengths near those of ambient noise level signals.

Another object of the present invention is to implement the beamforming process in such a manner that the decomposition of the acoustic field can be achieved efficiently, thus providing higher spatial resolution.

A still further object of the present invention is to provide a system allowing azimuth sampling which can be made arbitrarily dense, thus providing for enhanced detection of low intensity sonar signals.

Yet another object of the present invention is to provide a system such that false signal declaration is based on a robust, variable threshold detection scheme rather than upon constant threshold techniques.

Accordingly, an improved system and method for detecting, processing, and tracking sonar signal sources is provided. The system uses an inverse beamformer to efficiently decompose the acoustic field consisting of hydrophone element data. A spectrum normalizer normalizes the output acoustic field and defines a three-dimensional, nearly continuous surface having well-defined peak energy levels. An eight nearest-neighbor peak-picker derives the true peaks from the normalized output beams. Finally, a three-dimensional M of N tracker provides tracking over time of the peaks which match certain predetermined criteria. The data from the three-dimensional M of N tracker may be either displayed or recorded for further analysis. The invention also allows the use of a variable false alarm threshold which is actively adjusted, depending on received signal levels.

The novel features of this invention include more efficient (3 dB gain) decomposition of the acoustic field, increased spatial resolution, decreased azimuthal spacing between samples, enhanced detection of sources with low intensity levels, and variable, more robust false signal declarations.

BRIEF DESCRIPTION OF THE DRAWINGS

Other objects and advantages of the present invention will become more readily apparent by reference to the following specification and drawings, wherein:

FIG. 2 is a depiction of the eight nearest-neighbor peak-picker; and

DESCRIPTION OF THE PREFERRED EMBODIMENTS

Figure 1:
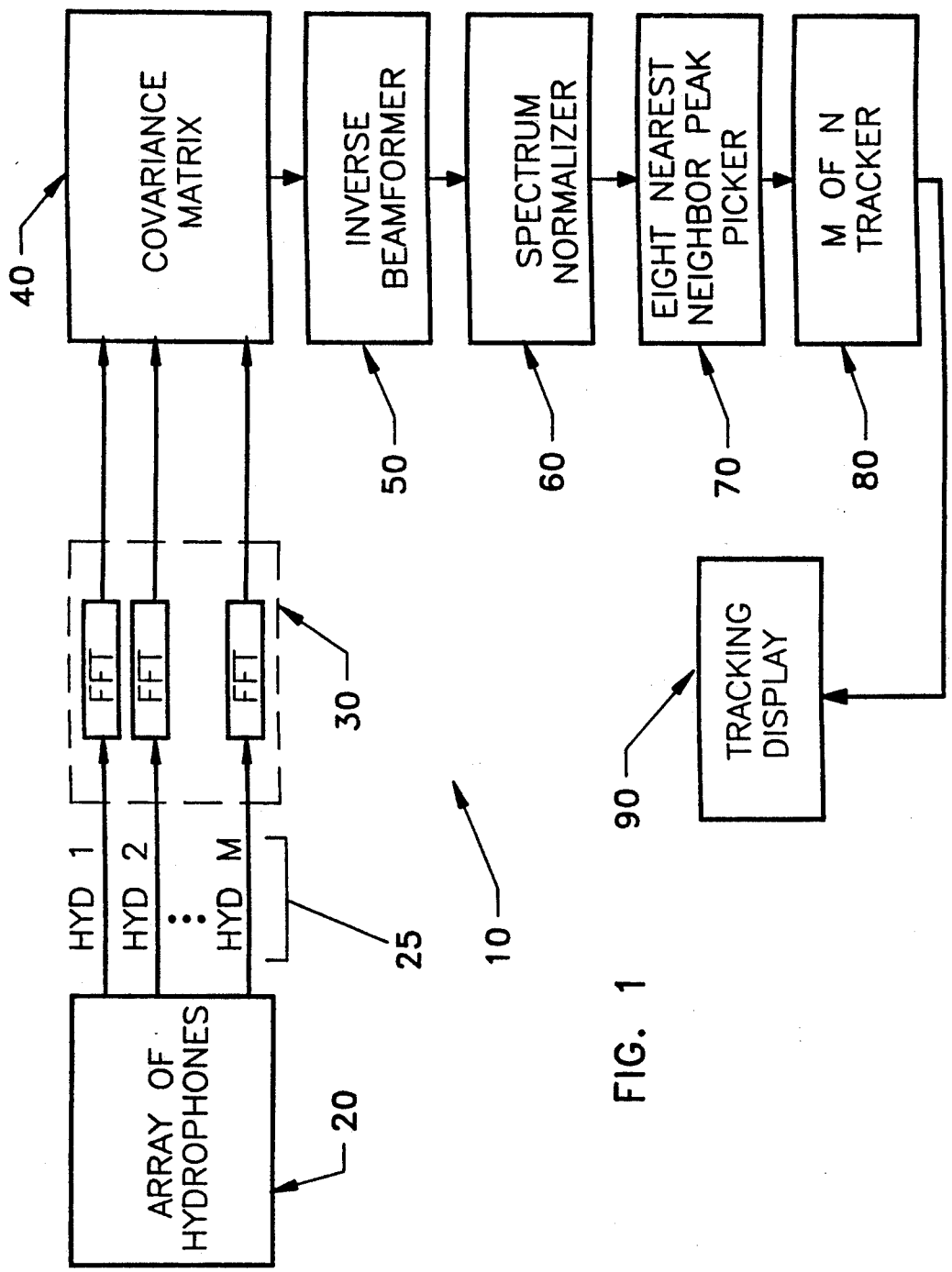
FIG. 1 is a functional block diagram of the complete inverse beamforming apparatus.

Referring now to the drawings, and in particular to FIG. 1, a preferred embodiment of an inverse beamforming sonar system 10 of the present invention is shown. Inverse beamforming system 10 comprises, in combination, a hydrophone array 20 of M hydrophones, a fast Fourier transformation (FFT) processing section 30, one FFT corresponding to each M hydrophone, a covariance matrix 40, an inverse beamformer 50, spectrum normalizer 60, an eight nearest-neighbor peak-picker 70, an M of N tracker 80, and a tracking display 90. The interconnection and operation of each of these components are described more fully below. Analog, plane wave acoustic energy is received by the hydrophones of array 20 or by any device capable of receiving plane wave acoustic energy and converting (using A/D converts) it to digital time series data. Fast Fourier transformation processing section 30 processes the digital time series data 25 from array 20 in such as way as to generate a covariance matrix generally shown as 40. The devices and processes used to generate the covariance matrix 40 form time series data 25 exist in the prior art and do not comprise novel features of the present invention, although their placement within the combination of the present invention is a novel feature.

The inverse beamformer 50 processes the covariance matrix 40 by using "inverse beamforming" algorithms which are executed on any computational platform capable of evaluating these alogorithms. Inverse beamforming, as the term is used herein, means not forming beams in the conventional manner but using instead the Fourier Integral Method (FIM) and the Fourier Series Method (FSM), each of which is set forth in greater detail below and also discussed by A. J. Nuttail and J. H. Wilson in "Estimation of the Acoustic Field Directionality by Use of Planar and Volumetric Arrays Via the Fourier Series Method and the Fourier Integral Method", *J. Acoustical Soc. Am.*, Vol. 90, No. 4, Pt. 1, Oct. 1991. The solutions to these inverse beamforming algorithms are direct estimates of the acoustic plane wave density and provide enhanced source detection and source bearing information. The solutions to both a Fourier Integral Method and a Fourier Series Method are computed for the inverse beamforming algorithms.

The inverse beamforming algorithm using the Fourier Integral Method for a linear array is as follows:

$$IVBF(u) = \frac{f}{2f_0} \int_{-\infty}^{+\infty} dp \; \exp(i\alpha u p) \, C(p) \quad (1)$$

for $-1 < u < 1$.

where $u = \cos\theta$; $\theta$ is the azimuth angle; $C(p)$ is the covariance matrix; $f$ is the acoustic frequency; $f_0$ is the design frequency of the array; $\alpha = \pi(f/f_0)$; and p's represent the hydrophone separations.

The inverse beamforming algorithm using the Fourier Integral Method for a planar array is as follows:

$$IVBF(u,v) = \frac{s(u,v)}{2\lambda^2} \left[ J(u,v,0) + \frac{J_i(u,v,z_0)}{\sin(2\pi s(u,v)z_0/\lambda)} \right] \quad (2)$$

where, $z_0$ = depth of the planar array,
$u = \sin\theta\cos\phi$,
$v = \sin\theta\sin\phi$, (where $\phi$ is an elevation angle), $$J(u,v,0) = \iint dx \, dy \, \exp\left[-i\frac{2\pi}{\lambda}(ux + vy)\right] C(x,y,0). \quad (3)$$

$$J_i(u,v,z_0) = \quad (4)$$

$$Im \iint dx \, dy \, \exp\left[-i\frac{2\pi}{\lambda}(ux + vy)\right] C(x,y,z_0), \text{ and}$$

$$s(u,v) = (1 - u^2 - v^2)^{\frac{1}{2}} \text{ for } u^2 + v^2 < 1, \quad (5)$$

where x and y are the hydrophone pair separation along the x and y axis of the coordinate system $\lambda$ is the wavelength and Im represents the imaginary part.

Finally, the inverse beamforming algorithm, using the Fourier Integral Method for a volumetric array, is as follows:

$$IVBF(\theta,\phi) = \quad (6)$$

$$\frac{\cos\theta}{2\lambda^2} \left[ J(\sin\theta\cos\phi,\sin\theta\sin\phi,0) + \frac{J_i(\sin\theta\cos\phi,\sin\theta\sin\phi, z_0)}{\sin(2\pi\cos\theta \, z_0/\lambda)} \right]$$

$$IVBF(\pi - \theta,\phi) = \quad (7)$$

$$\frac{\cos\theta}{2\lambda^2} \left[ J(\sin\theta\cos\phi,\sin\theta\sin\phi,0) - \frac{J_i(\sin\theta\cos\phi,\sin\theta\sin\phi, z_0)}{\sin(2\pi\cos\theta \, z_0/\lambda)} \right]$$

for $0 \leq \theta \pi/2, -\pi > \theta > \pi$.

On the other hand, the Fourier Series Method (FSM) equations involve the following summations, where $C(p)$ is the covariance matrix.

For a linear array, the inverse beamforming algorithm using the FSM is as follows:

$$IVBF(\theta) = \sum_{q=0}^{+\infty} a_q \cos(q\theta) \text{ for } 0 < \theta < \pi \quad (8)$$

The spatial coefficients $a_q$ for the linear array using the FSM are determined as follows:

$$a_0 = \frac{1}{\pi} C(0), \quad (9)$$

$$a_{2m} = \frac{2}{\pi} (-1)^m (2m) \int_0^{+\infty} dp \frac{J_{2m}(\alpha p)}{p} C_r(p) \quad (10)$$

for $m \geq 1$ $$a_{2m-1} = \frac{2}{\pi} (-1)^m (2m - 1) \int_0^{+\infty} dp \frac{J_{2m-1}(\alpha p)}{p} C_i(p) \quad (11)$$

for $m \geq 1$.

where, $$C(p) = C_r(p) + i C_i(p). \quad (12)$$

For a planar array, the inverse beamforming algorithm using the FSM is:

$$IVBF(\theta,\phi) = \sum_{k=0}^{\infty} [A_k \cos(k\theta) + B_k \sin(k\theta)]. \quad (13)$$

For a volumetric array, the inverse beamforming algorithm is:

$$IVBF(\theta,\phi) = \sum_{k+0}^{\infty} \sum_{m=0}^{k} [A_k^m \cos(m\theta) + B_k^m \sin(m\theta)] P_k^m(\cos\phi). \quad (14)$$

The FSM spatial coefficients for both the planar and volumetric arrays, (i.e., $\phi = 0$ for the planar array) are:

$$\begin{pmatrix} A_{2k-1}^m \\ B_{2k-1}^m \end{pmatrix} = \frac{(-1)^k \, m(2k - 1 - m)! 2(2k - 1)f/c}{\pi(2k - 1 + m)!} \times \quad (15)$$

$$\int_0^{\infty} dr_{jn} \int_0^{2\pi} d\theta_{jn} \int_0^{\pi} d\phi_{jn} \begin{pmatrix} \cos(m\theta_{jn}) \\ \sin(m\theta_{jn}) \end{pmatrix} j_{2k-1}(2\pi f r_{jn}/c) Im C_{jn}. \quad (16)$$

In the above equations, the terms $J_k$, $j_k$, and $P_k^m$ represent a Bessel function of the first kind of order k, a spherical Bessel function of order k, and an associated Legendre function of the first kind of order m and degree k, respectively. The inverse beamformer 50 provides the processing to solve these inverse beamforming aglorithms.

Spectrum normalizer 60 processes the outputs created by the inverse beamformer 50 using Wilson noise normalization algorithms, which are also executed on any computational platform capable of evaluating the mathematics of these algorithms. The Wilson noise normalization algorithm states that for each frequency bin and azimuthal cell, the computation $S_{wilson}$, the Wilson normalized signal, is simply the original signal S with noise N added and an estimation $N_{est}$ of the noise subtracted. In other words, $S_{wilson} = S + N - N_{est}$. The Wilson normalization of all the azimuthal Fourier Integral Solutions and Fourier Series Solutions to the inverse beamforming equations yields a three-dimensional, nearly continuous surface as a function of frequency and azimuth, in which the peak energy levels are well defined. The Wilson algorithm is not a novel feature of the present invention, although its placement within the present invention is a novel feature.

The eight nearest-neighbor peak-picker 70 thresholds data for detection within the normalized output from normalizer 60. It thresholds true energy peaks within the sonar field, without utilizing constant threshold values as more fully described below. The eight nearest-neighbor peak-picker 70 is a novel feature of the present invention.

The three-dimensional M of N tracker 80 processes the peaks from the peak-picker 70. The M of N tracker provides a method of tracking peaks within the sonar field and eliminating those peaks which do not meet a predetermined criteria of frequency and azimuth consistency over time. In this manner, the M of N tracker 80 can eliminate potential false targets which have been detected because the azimuth or the frequency of the sonar signal varies greatly over time. The M of N tracker is a novel feature of the present invention.

Finally, the output from the M of N tracker is sent to a user display station 90 or to a recording device.

Referring now to FIG. 2, a depiction of the methodology of the eight nearest-neighbor peak-picker 70 is shown. In particular, FIG. 2 gives a representative sample of the beam outputs from the Wilson normalizer 60 for nine adjacent frequency-azimuth space cells, the group of nine cells being represented generally by the reference numeral 75. The peak-picker 70 operates by examining each frequency-azimuth space cell and checking the inverse beamforming levels, shown in this figure for frequency bin 1 as beamforming levels 4,2 and −1 for azimuths 1, 2, and 3 respectively, of a given frequency-azimuth point and its eight surrounding neighbors. Only when the level of the center point is greater than all eight of its neighbors is the point considered to be a true peak as depicted by the beamforming level 8 circled for identification. In other words, a peak 77 is defined as a beam output level, $S_{wilson}$, that is greater than all eight of the beam outputs in the remaining adjacent frequency-azimuth space cells.

The solutions of the inverse beamformer 50 are a continuous function of bearing; thus beams can be formed every one degree or less. The sequence of steps providing solutions to the inverse beamforming equations thereby allow sampling at arbitrarily small azimuthal separations. Because the azimuth sampling of the inverse beamforming output can be arbitrarily small, the system 10 can readily detect low energy signals. This sequence of steps is a novel feature of the present invention providing a capability unavailable in prior art devices using time delay methods.

Figure 3A:
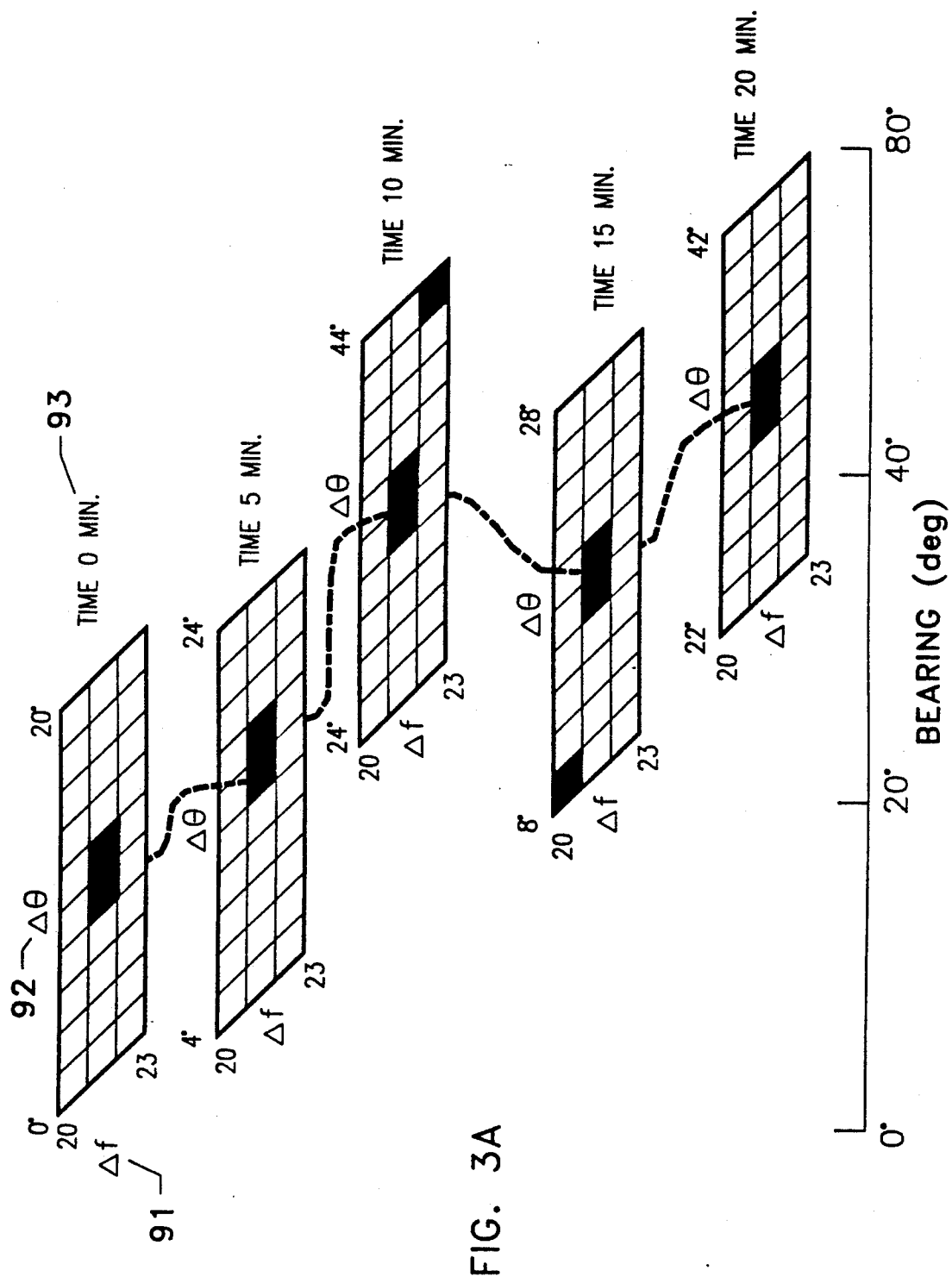
FIGS. 3A, 3B, and 3C show the interaction between the eight nearest-neighbor peak-picker, the three-dimensional M of N tracker, and the user display or recording unit.

Referring now to FIGS. 3 A–C, a depiction of the interaction between the eight nearest-neighbor peak-picker 70, the three-dimensional M of N tracker 80 and the user display/recording unit 90 is shown. As shown in FIG. 3A, the peak-picker 70 assigns frequency 91, azimuth 92, and time 93 for each peak detected. This data is made available to the M of N tracker, which in turn selects only those peaks which have changes in frequency and azimuth within predetermined limits. A time sequence of peaks must be present in M out of N time epochs, which is then passed along to the display/recording device. The M of N tracker thereby reduces the incidence of false peaks while significantly increasing the accuracy of estimation in bearing.

Figure 3B:
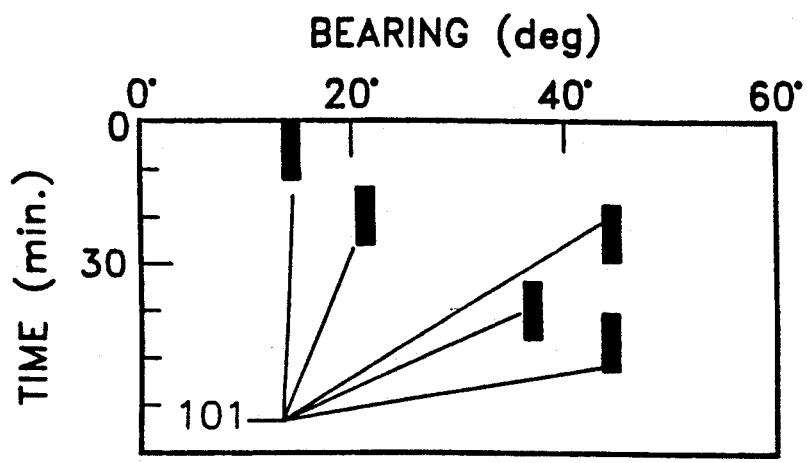
Figure 3C:
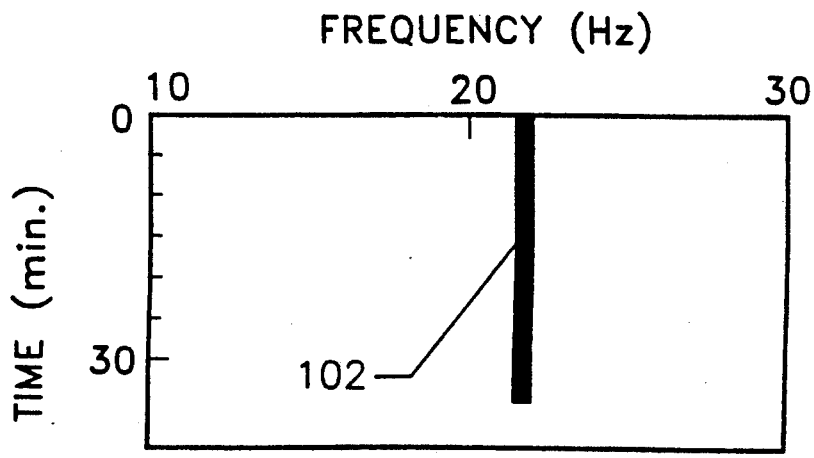

Examples of a detected track, as displayed, are shown in FIGS. 3B and 3C. FIG. 3B displays a plot 101 of azimuth or bearing versus time, and FIG. 3C displays a plot 102 of frequency versus time, each with the sampling characteristics listed below. Each peak in any given track has an output level versus time, frequency, and bearing assigned to it, such that every peak plotted in the frequency versus time displays is also plotted in the bearing versus time display. The input parameters of M of N trackers determine which time sequence of peaks form tracks and which peaks do not form tracks by restricting the bearing and frequency variations of the peaks from one time epoch to the next time epoch. If M out of N peaks do not satisfy the limits on peak frequency and bearing variation with time, then no track is detected. A large number of detected peaks does not necessary imply that a large number of tracks will be detected in this manner, because the number of false targets is greatly reduced.

The advantages of the present invention are numerous. The system takes advantage of more efficient signal processing algorithms to allow for enhanced signal detection. The inverse beamformer algorithm provides a well-formed three-dimensional field in which peaks may be readily identified. This field allows the azimuth sampling to be made arbitrarily small, in order to detect low intensity sonar signals. The eight nearest-neighbor peak-picker applies a data thresholding technique that allows detection of low level signals and the three-dimensional M of N tracker provides a system for reducing false targets. This system results in more robust reduction of false detection as well as in more accurate estimation of signal bearing. Further, either the FIM or the FSM technique may be used alone as opposed to combined and described above. Finally, all of the above advantages may be implemented on a variety of computational hardware which is capable of evaluating mathematics of the various algorithms in real time. This new technique for detecting and processing signals may also be applied to any time series sensor including radar, sonar, ocean wave sensors and space system sensors. These signals can be provided as input to the inverse beamformer with approved sign detection and bearing estimation results. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for detecting and processing sonar signals comprising the steps of:

receiving a sonar signal;

generating a plurality of normalized output beam levels from said received sonar signal, said step of generating normalized output beam levels further comprising, generating a covariance matrix from said received sonar signal, said step of generating a covariance matrix from a received sonar signal further comprising calculating a Fourier solution thereby producing a time series of the signal source data, and generating output beam levels from said covariance matrix;

deriving peaks from said normalized output beam levels;

identifying said peaks within predetermined selection criteria over time; and displaying and recording said identified peaks.

2. A method for detecting and processing sonar signals as in claim 1 wherein said step of calculating a Fourier solution comprises calculating a Fourier series solution.

3. A method for detecting and processing sonar signals as in claim 1 wherein said step of calculating a Fourier solution comprises calculating a Fourier integral solution.

4. A method for detecting and processing sonar signals as in claim 1 wherein said step of generating output beam levels from the covariance matrix further comprises solving the Fourier Integral Method and fourier Series Method spatial beamforming equations for linear, planar, and volumetric arrays.

5. A method for detecting and processing sonar signals as in claim 1 wherein said step of generating normalized output beam levels comprises applying Wilson noise normalization.

6. A method for detecting and processing sonar signals as in claim 1 wherein said step of driving peaks from the normalized output levels further comprises selecting eight nearest-neighbor peaks.

7. A method for detecting and processing sonar signals as in claim 1 wherein said steps of identifying peaks within predetermined criteria further comprises identifying peaks within specified frequency and azimuthal criteria.

* * * * *